United States Patent [19]
Kato et al.

[11] Patent Number: 4,485,900
[45] Date of Patent: Dec. 4, 1984

[54] DAMPING FORCE GENERATING MECHANISM IN HYDRAULIC DAMPER

[75] Inventors: Tetuo Kato; Ieaki Miura; Masahiro Ashiba; Tomio Imaizumi, all of Kanagawa, Japan

[73] Assignee: Tokico Ltd., Kanagawa, Japan

[21] Appl. No.: 397,860

[22] Filed: Jul. 13, 1982

[30] Foreign Application Priority Data

Jul. 20, 1981 [JP] Japan .................. 56-107422[U]

[51] Int. Cl.$^3$ ............................................. F16F 9/348
[52] U.S. Cl. .................................. 188;282; 137/854; 188/317; 188/322.15
[58] Field of Search ............. 188/317, 282, 322.15, 188/318, 322.13; 137/854, 855, 357, 493.9

[56] References Cited
U.S. PATENT DOCUMENTS
4,111,231  9/1978  Leppich .................. 137/854

FOREIGN PATENT DOCUMENTS
472601  6/1969  Switzerland .................. 188/317

Primary Examiner—Duane A. Reger
Assistant Examiner—Michael P. Gilday
Attorney, Agent, or Firm—Wenderoth, Lind & Ponack

[57] ABSTRACT

A damping force generating mechanism in a hydraulic damper includes a housing containing therein oil and an oil chamber partitioning member such as a piston. The mechanism includes a communicating passage provided in the oil chamber partitioning member and defining an annular valve seat on one end thereof and an annular valve plate provided on one end of the communicating passage and being deflectable toward and away from the valve seat for permitting the oil to flow in the communicating passage in one direction. The plate valve consists of a plurality of mutually overlapping annular plates, and at least one of the annular plates is deflected in the direction separating from the valve seat by a projection member which also is one of the annular plates.

3 Claims, 8 Drawing Figures

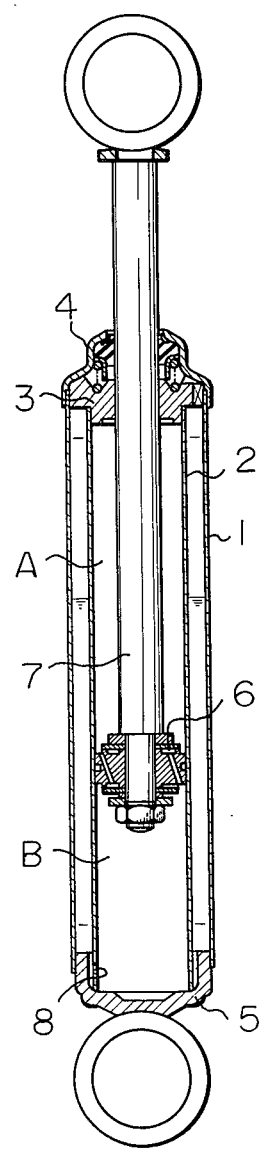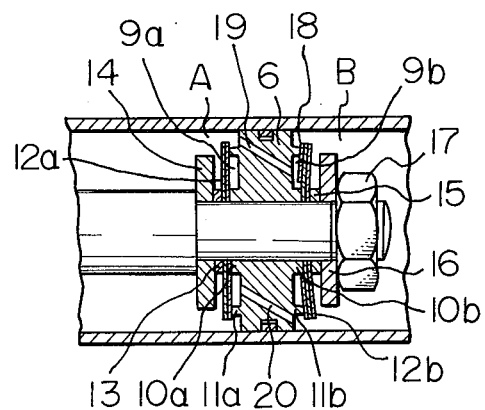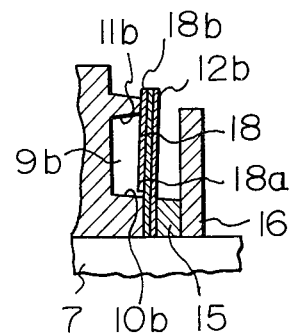

DAMPING FORCE GENERATING MECHANISM IN HYDRAULIC DAMPER

BACKGROUND OF THE INVENTION

This invention relates to a hydraulic damper and, particularly to improvements in a damping force generating mechanism in the hydraulic damper.

It is usually required that the damping force of a hydraulic damper in the extension stroke of the damper be higher than that in the contraction stroke, and for satisfying the requirement, various types of damping force generating mechanisms hithertofore have been proposed. One prior art damping force mechanism consists of valve seats formed on opposite side surfaces of a piston which acts as an oil chamber partitioning member, and annular plate valves cooperating with the valve seats, whereby the piston acts to generate the damping force both in the extension and contraction strokes of the damper. However, the configuration of the piston and plate valves are not equal with respect to the extension and contraction sides and, accordingly, the damping force characteristics can not be adjusted as desired due to a lack of accuracy in the manufacturing process for the piston and plate valves and to errors in the assembling process.

SUMMARY OF THE INVENTION

The object of the present invention is to remove the shortcoming aforementioned and, according to the invention, the plate valve is formed of a plurality of mutually overlapping annular plates, and at least one of the annular plates is deflected in the direction separating from the corresponding valve seat by a projection member which also is one of the mutually overlapping annular plates.

The initial deflection of the plate valve can easily be adjusted by the projection member and, thus, it is possible to determine the damping force characteristics as desired.

BRIEF DESCRIPTION OF THE DRAWINGS

Further objects and advantages of the invention will become apparent from the following detailed descriptions taken in conjunction with the accompanying drawings exemplifying some preferred embodiments of the invention, and in which:

FIG. 1 is a longitudinal sectional view of a hydraulic damper according to the invention;

FIG. 2 is an enlarged partial sectional view of FIG. 1;

FIG. 3 is a further enlarged partial sectional view of FIGS. 1 and 2;

DETAILED DESCRIPTION OF THE PREFERRED EMBODIMENTS

Figure 4:
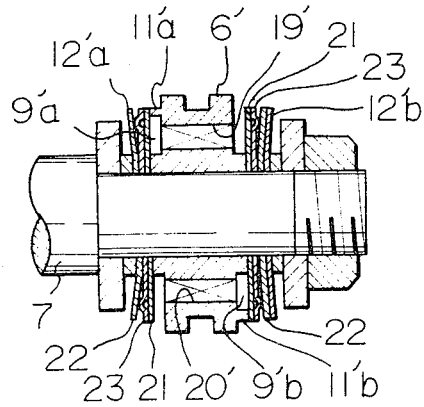
FIG. 4 is a view similar to FIG. 2 but showing a modified form.

The hydraulic damper illustrated in FIG. 1 comprises coaxial outer and inner tubes 1 and 2, a rod guide 3 located on the upper end of the inner tube 2, a cap 4 closing the upper ends of the outer and inner tubes 1 and 2, and a bottom cap 5 closing the lower ends of the outer and inner tubes 1 and 2. The inner tube 2 acts as a cylinder for slidably receiving therein a piston 6 which partitions the interior of the inner tube 2 into oil chambers A and B, and thus, the piston 6 acts as an oil chamber partitioning member. A piston rod 7 is secured to the piston 6 and extends through the rod guide 3 to the outside. A restricted passage or orifice 8 is formed in the lower end portion of the inner tube 2 to communicate the chamber B with an annular chamber defined between the outer and inner tubes 1 and 2. The annular chamber acts as a reservoir chamber and contains therein oil and gas. The chambers A and B are filled with oil.

As shown in FIG. 2, the piston 6 has in opposite side surfaces thereof annular recesses 9a and 9b which are defined by inner circumferential walls 10a and 10b and by outer circumferential walls 11a and 11b. The height of inner circumferential walls 10a and 10b as measured from the bottom of the recesses 9a and 9b is equal to that of the outer circumferential walls 11a and 11b, and the outer circumferential walls 11a and 11b define annular valve seats on the outer edges thereof. The valve seats cooperate with plate valves 12a and 12b respectively. The inner circumferential portion of the plate valve 12a abuts with the piston rod 7 through a spacer 13 and a retainer 14, and the inner circumferential portion of the plate valve 12b abuts with a nut 17 through a spacer 15 and a retainer 16. The plate valves 12a and 12b and the piston 6 together with spacers 13 and 15 and retainers 14 and 16 are secured integrally to the piston rod 7 by tightening the nut 17 on the piston rod 7. The recess 9a is communicated permanently with the oil chamber B through a plurality of angularly spaced passages 20 (only one is shown in FIG. 2), and the recess 9b is communicated permanently with oil chamber A through a plurality of angularly spaced passages 19 (only one is shown in FIG. 2).

In the embodiment shown in FIG. 2, the plate valve 12a consists of two mutually overlapping annular plates, and the plate valve 12b consists of three mutually overlapping annular plates including an annular plate 18. The annular plate 18 acts as a projection member according to the invention and, as shown in FIG. 3, the inner circumference of the plate 18 is guided by the inner circumferential wall 10b of the recess 9b and the outer circumferential portion of the plate 18 is clamped between the valve seat and the remaining two mutually overlapping annular plates of the plate valve 12b. Therefore, the plate valve 12b is deflected initially or in the closed condition by an amount equal to the thickness of the plate 18 as compared with the plate valve 12a.

The damping force of the damper of FIG. 1 in the extension stroke is determined by the plate valve 12b and that in the contraction stroke is determined by the plate valve 12a and the plate valve 12b has been flexed by the thickness of the plate 18 as compared with the plate valve 12a. Therefore, the force for opening the plate valve 12b is larger than the force for opening the plate valve 12a, and the damping force in the extension stroke is larger than the damping force in the contraction stroke even though the rigidity, thickness and the material of two mutually overlapping plates of each of the plate valves 12a and 12b are equal. It will be noted that the plate 18 freely moves with the remaining two overlapping plates in opening the valve and thus has no effect on the damping force. However, in the closed condition, the plate directly engages with the valve seat.

Figure 5A:
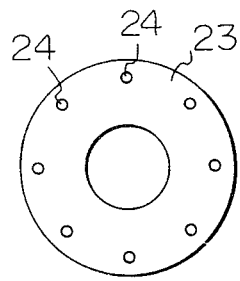
FIG. 5A is a plan view of a projection member.
Figure 5B:
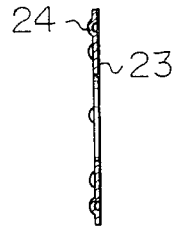
FIG. 5B is a side view of FIG. 5A.

FIGS. 4, 5A and 5B show another embodiment of the invention, wherein the piston 6 has in opposite surfaces thereof a plurality of angularly spaced recesses 9′a and 9′b (only one of each recess is shown in FIG. 4) and a corresponding number of cutouts communicating respectively with axially extending passages 19′ and 20′. The passages 19′ and 20′ communicate permanently with recesses 9′a and 9′b. Each recess 9′a, 9′b has preferably a circular configuration. The plate valve 12′a consists of three mutually overlapping annular plates, namely, a generally flat plate 21, a projection member 23 and an annular plate 22, and the plate valve 12′b consists of four mutually overlapping annular plates, namely, a generally flat plate 21, a projection member 23 and two mutually overlapping annular plates 22. The projection member 23 has, as shown in FIGS. 5A and 5B, a plurality of angularly spaced projections 24 on the outer circumferential portion thereof. The annular plate 22 of the plate valve 12′a and two annular plates 22 of the plate valve 12′b are flexed by the projections 24 on the projection members 23. Thus, as compared with the plate valve 12′a, the plate valve 12′b generates a large damping force. In this embodiment, the projection members 23 are equal with respect to the plate valves 12′a and 12′b and each of the plates 21 and 22 is identical, thereby simplifying the assembling operation.

Figures 6A, 6B:
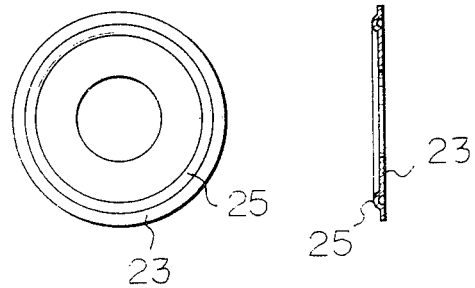
FIG. 6A is a plan view of a modified projection member.
FIG. 6B is a side view of FIG. 6A.

FIGS. 6A and 6B show a modified form of the projection member 23, wherein the projections 24 in FIG. 5A are by a circular ridge 25.

It will be understood that the invention is not limited to the illustrated embodiments, and various changes or modifications will be apparent to those skilled in the art. For example, the projection member 23 in the second embodiment may be incorporated in the piston 6 of FIGS. 1-3. Further, in the embodiment of FIG. 4, the annular plates 21, 22 and 23 are formed of the same material, however, they may be formed of different materials (such as a spring steel for plates 21 and 22 and a synthetic resin for the plate 23).

As described heretofore, according to the invention, the plate valve located on one side surface of an oil chamber partitioning member is flexed by a projection member. Thus, it is very easy to fabricate and assemble the oil chamber partitioning member, and it is possible to avoid errors in the assembling operation, thereby improving the reliability and the operational characteristics of the damper.

What is claimed is:

1. A damping force generating mechanism in a hydraulic damper including a housing containing therein oil and an oil chamber partitioning member such as a piston, said mechanism comprising a communicating passage provided in said oil chamber partitioning member and defining a valve seat on one end thereof, and an annular plate valve provided on one end of said passage and being deflectable toward and away from said valve seat for permitting the oil to flow in said passage in one direction, said plate valve comprising a plurality of mutually overlapping annular plates having inner circumferences, said inner circumferences of all of said annular plates being rigidly connected to said oil chamber partitioning member, at least one of said annular plates constituting a projection member having on the outer circumferential portion thereof at least one integral projection deflecting the outer circumferential portion of at least one other of said annular plates in a direction to be separated from said valve seat.

2. A damping force generating mechanism as claimed in claim 1, wherein said projection member comprises an annular disc having on said outer circumferential portion thereof an annular ridge forming said projection.

3. A damping force generating mechanism as claimed in claim 1, wherein said projection member comprises an annular disc having on said outer circumferential portion thereof a plurality of circumferentially spaced projections forming said at least one projection.

* * * * *